US011257460B1

(12) United States Patent
Rinaudo

(10) Patent No.: US 11,257,460 B1
(45) Date of Patent: Feb. 22, 2022

(54) CIRCUITOUS DISPLAY SYSTEMS AND METHODS

(71) Applicant: Bennett S. Rinaudo, Shreveport, LA (US)

(72) Inventor: Bennett S. Rinaudo, Shreveport, LA (US)

( * ) Notice: Subject to any disclaimer, the term of this patent is extended or adjusted under 35 U.S.C. 154(b) by 0 days.

(21) Appl. No.: 16/294,322

(22) Filed: Mar. 6, 2019

Related U.S. Application Data

(60) Provisional application No. 62/687,607, filed on Jun. 20, 2018.

(51) Int. Cl.
| | |
|---|---|
| *G09G 5/00* | (2006.01) |
| *G09G 5/14* | (2006.01) |
| *G06F 3/14* | (2006.01) |
| *G09F 9/302* | (2006.01) |
| *G09F 15/00* | (2006.01) |

(52) U.S. Cl.
CPC ........... *G09G 5/006* (2013.01); *G06F 3/1423* (2013.01); *G09F 9/302* (2013.01); *G09F 15/0037* (2013.01); *G09G 5/14* (2013.01); *G09G 2360/04* (2013.01); *G09G 2380/06* (2013.01)

(58) Field of Classification Search
None
See application file for complete search history.

(56) References Cited

U.S. PATENT DOCUMENTS

2006/0287913 A1\* 12/2006 Baluja ................ G06Q 30/0249
705/14.54
2006/0290592 A1\* 12/2006 Wampler .............. G06F 3/1438
345/2.1
2008/0098305 A1\* 4/2008 Beland .................. G06F 3/0482
715/719
2009/0049097 A1\* 2/2009 Nocifera ................ G06Q 30/02
2010/0118200 A1\* 5/2010 Gelman ................. G06F 3/041
348/578

(Continued)

OTHER PUBLICATIONS

"LED Concourse Fascia" by Louis M. Brill of signindustry.com, Sep. 20, 2003 (archived on Jun. 17, 2017) http://web.archive.org/web/20170617130250/http://www.signindustry.com/led/articles/2003-08-29-LEDConcourse.php3 (Year: 2003).\*

(Continued)

*Primary Examiner* — Michael Bekerman
*Assistant Examiner* — Scott Snider
(74) *Attorney, Agent, or Firm* — Holoubek Patent Law, LLC; Charlotte Holoubek

(57) ABSTRACT

Illustrative embodiments of the disclosure are generally directed to circuitous display systems methods which facilitate automated scheduling and uploading of advertising and/or other content to different display faces in a network or display circuit of billboard or other display faces and automatic circuitous, sequential or rotational presentation of the content among the display faces. An illustrative embodiment of the circuitous display systems may include at least a first display face and a second display face. At least one display control system may controllably interface with each of the first display face and the second display face. The at least one display control system may be configured to present content on the first display face and the second display face in an automatic circuitous, sequential or rotational pattern.

18 Claims, 18 Drawing Sheets

(56) References Cited

U.S. PATENT DOCUMENTS

| | | | | |
|---|---|---|---|---|
| 2011/0270948 A1* | 11/2011 | Zmuda | ................... | G09G 5/14 |
| | | | | 709/217 |
| 2013/0103505 A1* | 4/2013 | Myers | ................ | G06Q 30/0276 |
| | | | | 705/14.69 |
| 2014/0149221 A1 | 5/2014 | Rycyna, III | | |
| 2014/0337137 A1* | 11/2014 | Robertson | .......... | G06Q 30/0273 |
| | | | | 705/14.61 |
| 2018/0330403 A1* | 11/2018 | Olivieri | .............. | G06Q 30/0264 |

OTHER PUBLICATIONS

"Rinaudo Media", by The Forum News, Jan. 5, 2018, https://theforumnews.com/article-2821-rinaudo-media.html (Year: 2018).*

Lafave, Joseph, "A New Digital Billboard Network Comes To Shreveport Bossier", Shreveport news, https://www.shreveportnews.com/business/a-new-digital-billboard-network-comes-to-shreveport-bossier/2173/ (Year: 2018).*

Michal Wlosik, "What is Digital Out-of-Home (DOOH) Advertising and How Does It Work?" Dec. 2018, https://clearcode.cc/blog/what-is-digital-out-of-home-dooh/ (Year: 2018).*

\* cited by examiner

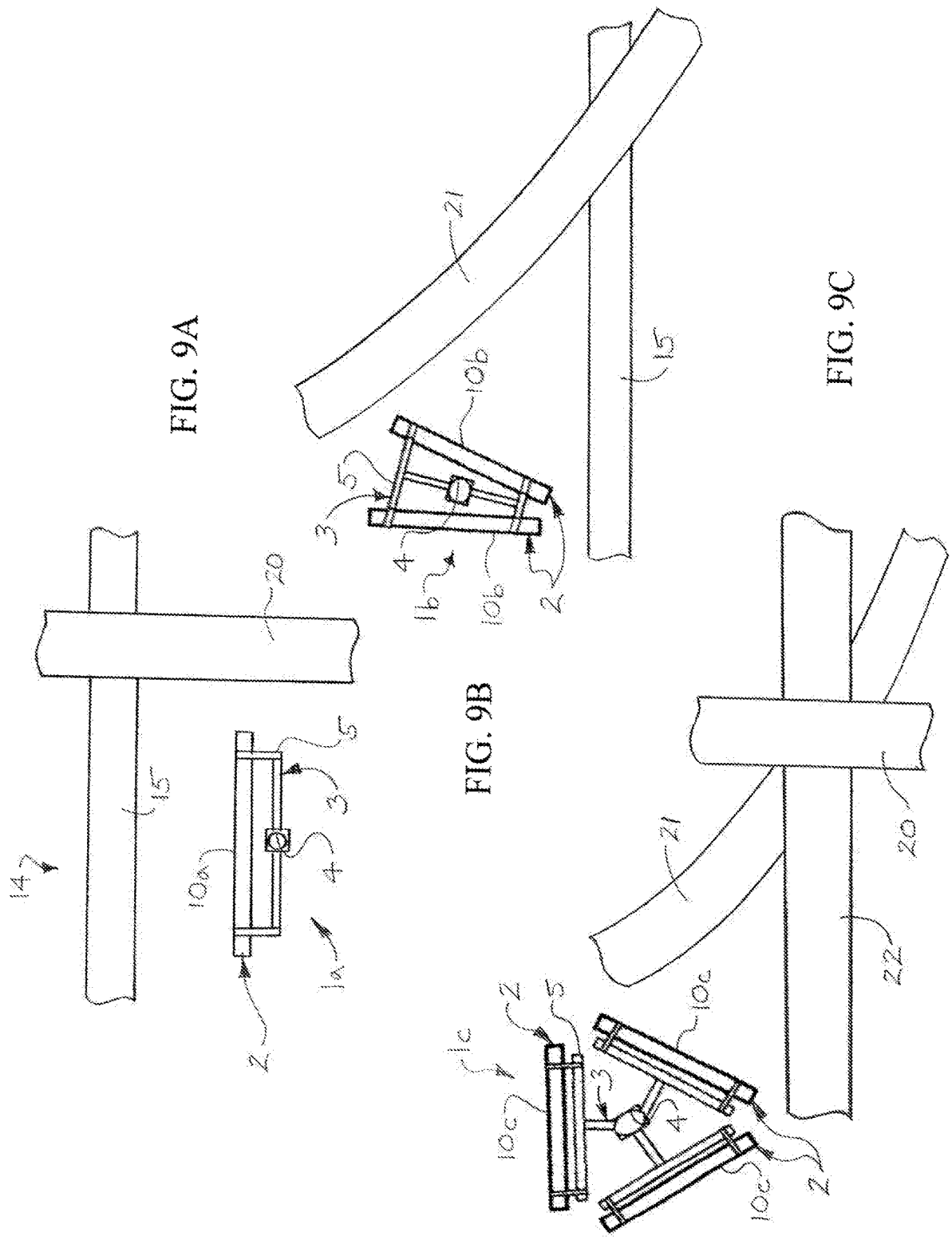

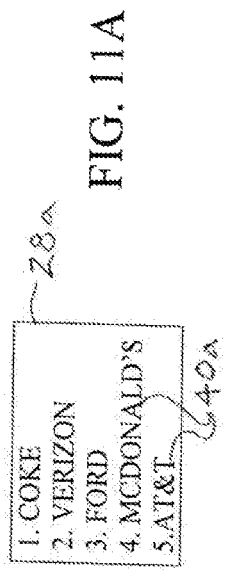
FIG. 11A
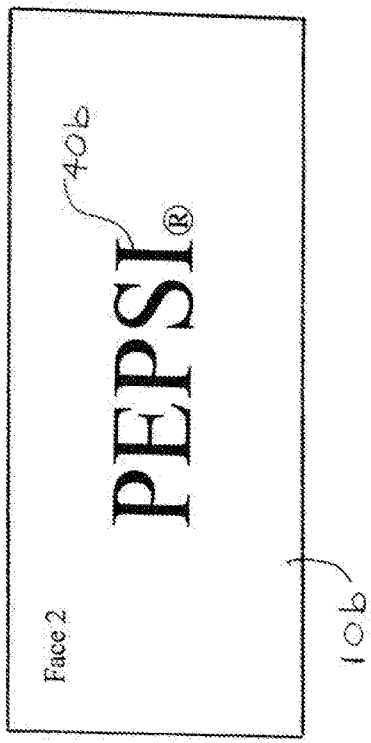
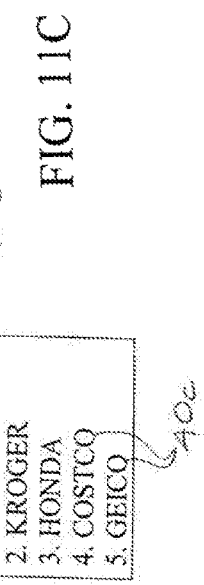
FIG. 11C
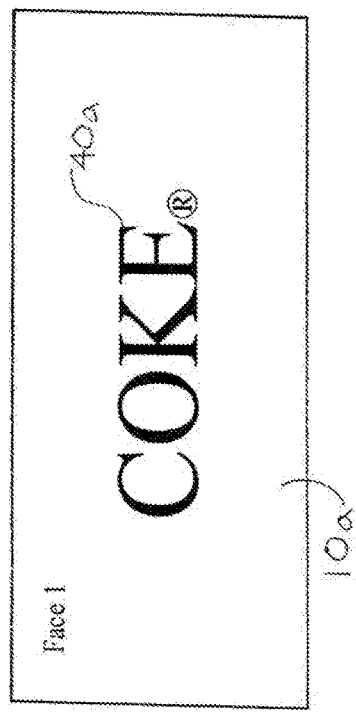
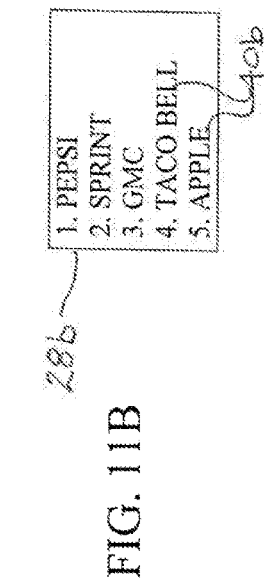
FIG. 11B
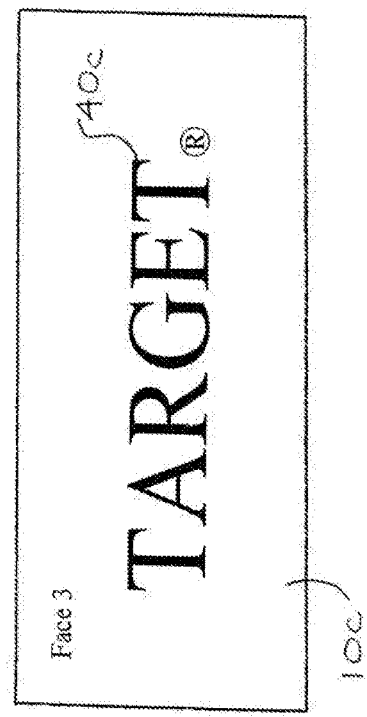

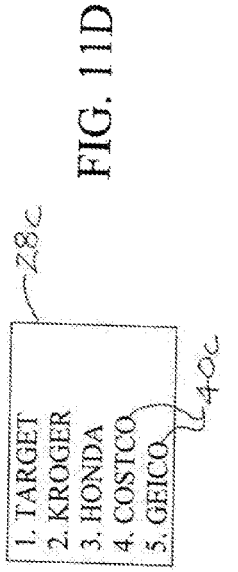
FIG. 11D
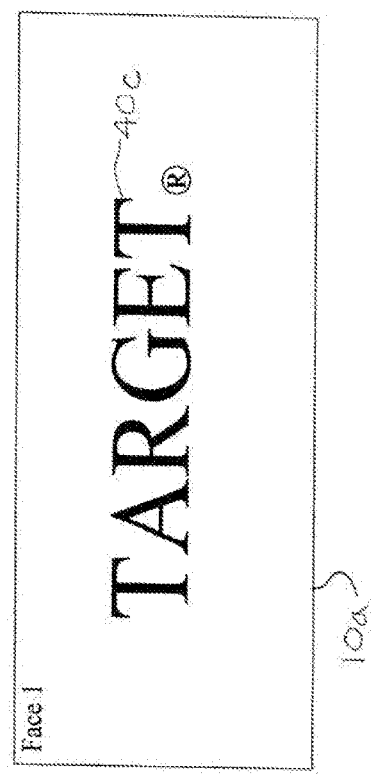
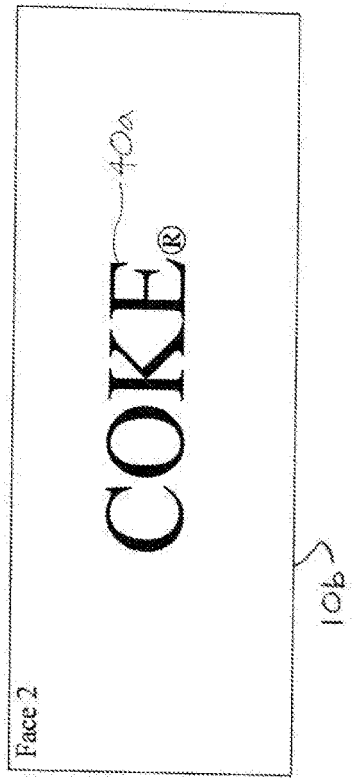
FIG. 11E
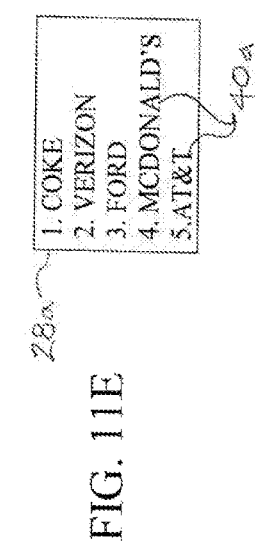
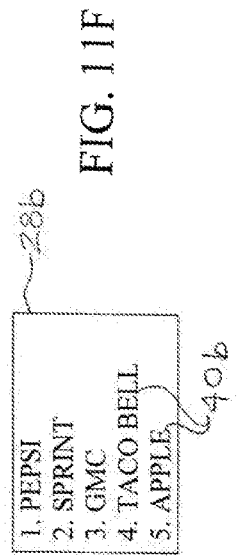
FIG. 11F
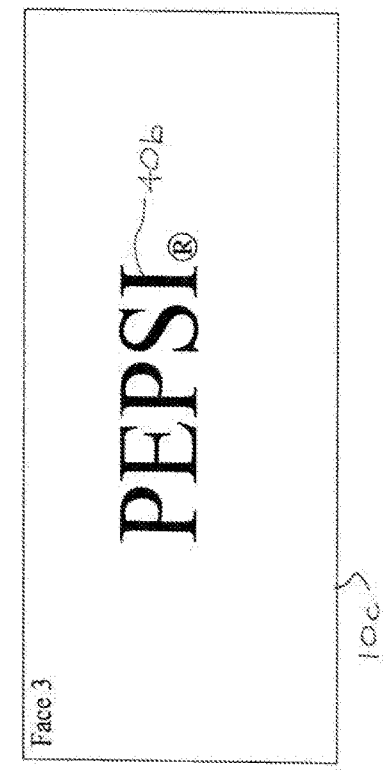

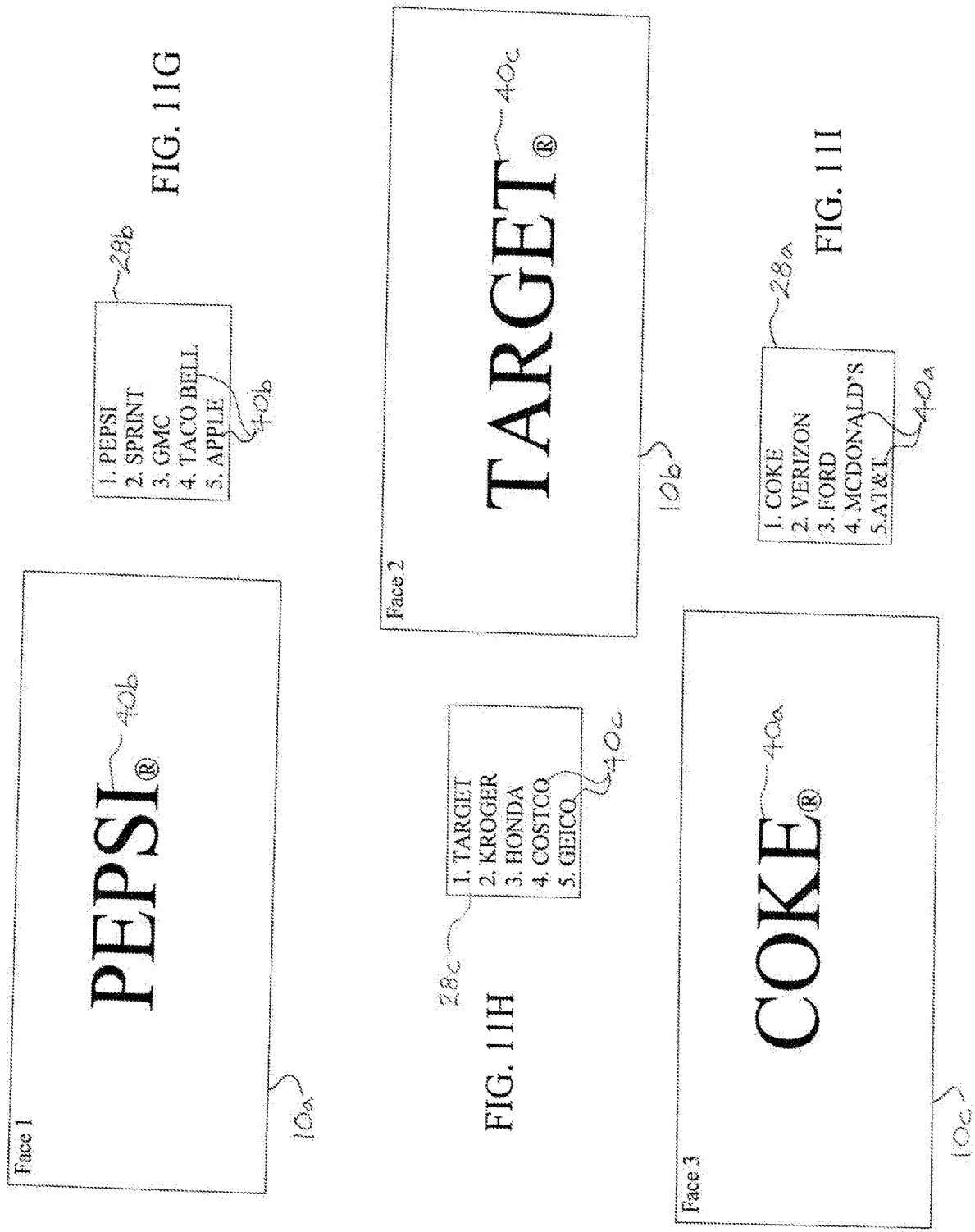

Face 1 Playlist

| Rotation No. | Ad Display Time (s) | Loop | Slot | Client |
|---|---|---|---|---|
| 1 | 8 | A | 1 | COKE |
| 1 | 8 | A | 2 | VERIZON |
| 1 | 8 | A | 3 | FORD |
| 1 | 8 | A | 4 | MCDONALD'S |
| 1 | 8 | A | 5 | AT&T |
| 2 | 8 | C | 1 | TARGET |
| 2 | 8 | C | 2 | KROGER |
| 2 | 8 | C | 3 | HONDA |
| 2 | 8 | C | 4 | COSTCO |
| 2 | 8 | C | 5 | GEICO |
| 3 | 8 | B | 1 | PEPSI |
| 3 | 8 | B | 2 | SPRINT |
| 3 | 8 | B | 3 | GMC |
| 3 | 8 | B | 4 | TACO BELL |
| 3 | 8 | B | 5 | APPLE |

FIG. 12

Face 2 Playlist

| Rotation No. | Ad Display Time (s) | Loop | Slot | Client |
|---|---|---|---|---|
| 1 | 8 | B | 1 | PEPSI |
| 1 | 8 | B | 2 | SPRINT |
| 1 | 8 | B | 3 | GMC |
| 1 | 8 | B | 4 | TACO BELL |
| 1 | 8 | B | 5 | APPLE |
| 2 | 8 | A | 1 | COKE |
| 2 | 8 | A | 2 | VERIZON |
| 2 | 8 | A | 3 | FORD |
| 2 | 8 | A | 4 | MCDONALD'S |
| 2 | 8 | A | 5 | AT&T |
| 3 | 8 | C | 1 | TARGET |
| 3 | 8 | C | 2 | KROGER |
| 3 | 8 | C | 3 | HONDA |
| 3 | 8 | C | 4 | COSTCO |
| 3 | 8 | C | 5 | GEICO |

FIG. 13

Face 3 Playlist

| Rotation No. | Ad Display Time (s) | Loop | Slot | Client |
|---|---|---|---|---|
| 1 | 8 | C | 1 | TARGET |
| 1 | 8 | C | 2 | KROGER |
| 1 | 8 | C | 3 | HONDA |
| 1 | 8 | C | 4 | COSTCO |
| 1 | 8 | C | 5 | GEICO |
| 2 | 8 | B | 1 | PEPSI |
| 2 | 8 | B | 2 | SPRINT |
| 2 | 8 | B | 3 | GMC |
| 2 | 8 | B | 4 | TACO BELL |
| 2 | 8 | B | 5 | APPLE |
| 3 | 8 | A | 1 | COKE |
| 3 | 8 | A | 2 | VERIZON |
| 3 | 8 | A | 3 | FORD |
| 3 | 8 | A | 4 | MCDONALD'S |
| 3 | 8 | A | 5 | AT&T |

FIG. 14

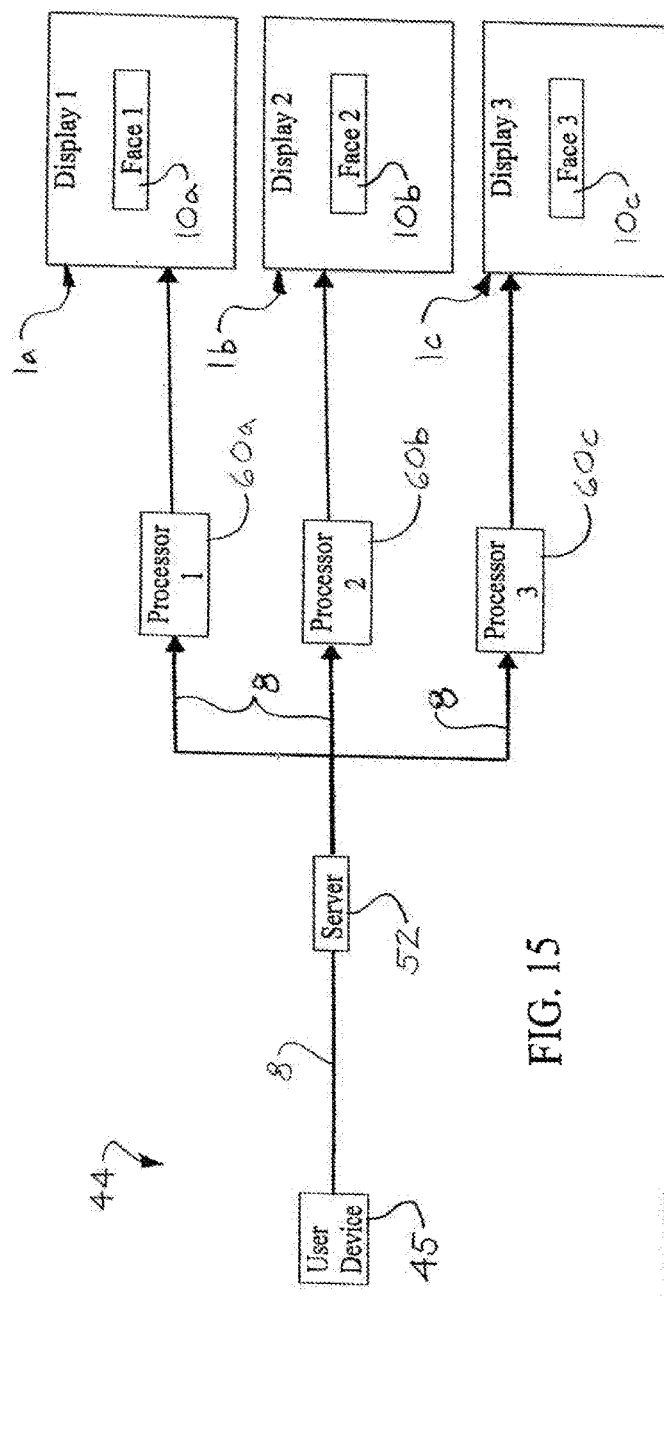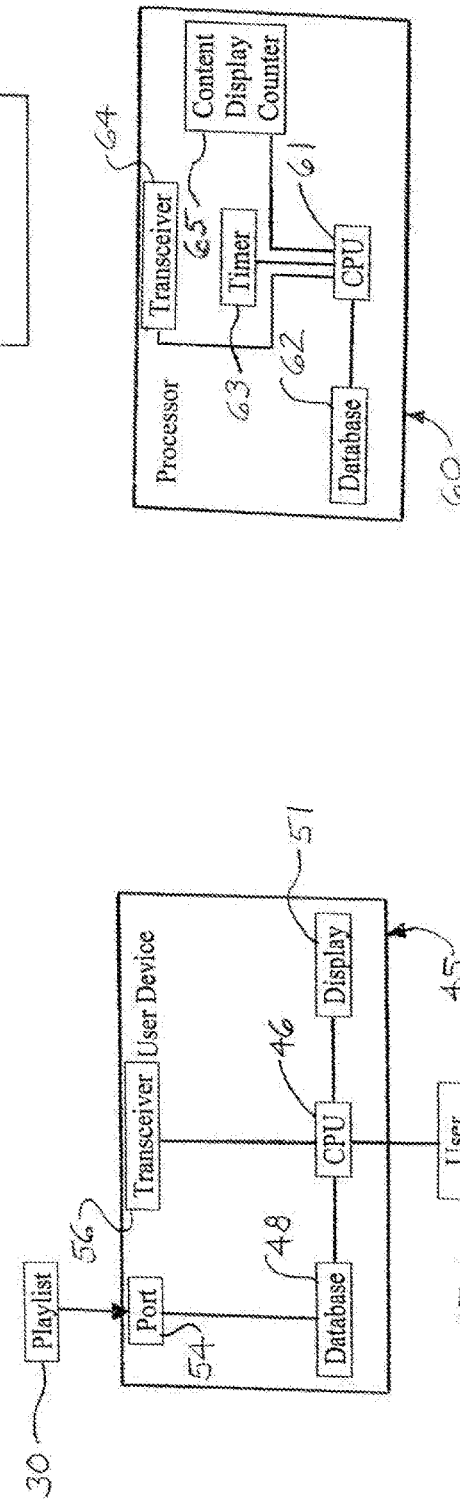
FIG. 15
FIG. 16A
FIG. 16B

CIRCUITOUS DISPLAY SYSTEMS AND METHODS

CROSS-REFERENCE TO RELATED APPLICATIONS

This application claims the benefit of U.S. provisional application No. 62/687,607, filed Jun. 20, 2018 and entitled CIRCUITOUS DISPLAY SYSTEMS AND METHODS, which provisional application is hereby incorporated by reference herein in its entirety.

FIELD

Illustrative embodiments of the disclosure relate to displays such as digital billboards and the like. More particularly, illustrative embodiments of the disclosure relate to circuitous display systems and methods which facilitate automated scheduling and uploading of advertising and/or other content to different display faces in a network or display circuit of billboard or other display faces and automatic circuitous, sequential or rotational presentation of the content among the display faces or one or more selected subsets of the display faces.

SUMMARY

Illustrative embodiments of the disclosure are generally directed to circuitous display systems methods which facilitate automated scheduling and uploading of advertising and/or other content to different display faces in a network or display circuit of billboard or other display faces and automatic circuitous, sequential or rotational presentation of the content among the display faces or one or more selected subsets of the display faces within the network or display circuit. An illustrative embodiment of the circuitous display systems may include at least a first display face and a second display face. At least one display control system may controllably interface with each of the first display face and the second display face. The at least one display control system may be configured to present content on the first display face and the second display face in an automatic circuitous, sequential or rotational pattern.

Illustrative embodiments of the disclosure are further generally directed to circuitous display methods of controlling a plurality of display faces. An illustrative embodiment of the circuitous display methods may include presenting content on at least a first display face and a second display face in an automatic circuitous, sequential or rotational pattern.

BRIEF DESCRIPTION OF THE DRAWINGS

Illustrative embodiments of the disclosure will now be described, by way of example, with reference to the accompanying drawings, in which:

FIGS. 9A-9C illustrate the single-, double- and triple-paneled billboard displays, respectively, at a corresponding location within the geographical area illustrated in FIG. 8 in exemplary implementation of the circuitous display systems and methods:

FIGS. 11A-11I illustrate presentation of content in the form of listed ads of respective clients on the respective first, second and third display faces in the display circuit throughout a portion of each of the first, second and third loop rotations of the respective loops of content in exemplary implementation of the circuitous display systems and methods;

FIG. 12 illustrates a typical playlist for the first display face throughout the first, second and third loop rotations;

FIG. 13 illustrates a typical playlist for the second display face throughout the first, second and third loop rotations;

FIG. 14 illustrates a typical playlist for the third display face throughout the first, second and third loop rotations;

FIG. 15 is a functional block diagram of a typical display control system suitable for some implementations of the circuitous display systems and methods;

FIG. 16A is a functional block diagram illustrating a typical user device of the display control system suitable for some implementations of the circuitous display systems and methods;

FIG. 16B is a functional block diagram illustrating a typical processor of the display control system suitable for some implementations of the circuitous display systems and methods;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
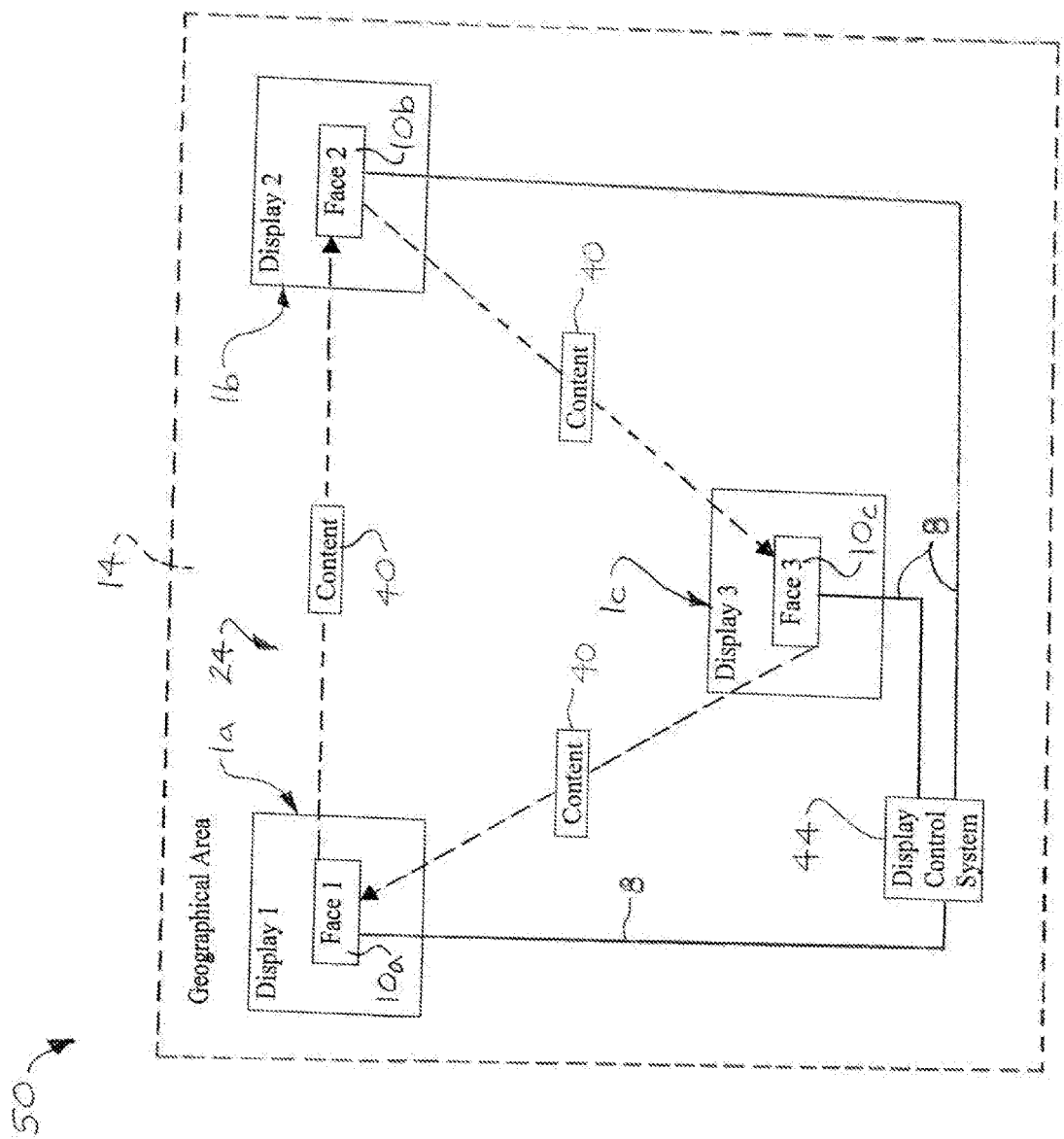
FIG. 1A is a schematic diagram of an illustrative embodiment of the circuitous display systems and methods.

Referring initially to FIG. 1A of the drawings, an illustrative embodiment of the circuitous display systems, hereinafter display system, is generally indicated by reference numeral 50. As will be hereinafter further described, the system 50 may include at least two display faces 10. In the non-limiting embodiment illustrated in FIG. 1A, for illustrative purposes and for brevity, the system 50 includes three display faces 10a, 10b and 10c, respectively. In alternative embodiments, however, the system 50 may include as few as two or as many as ten (designated by reference numerals 10a-10j, respectively, in FIG. 1B) or more display faces 10.

As further illustrated in FIG. 1A, in some embodiments, each display face 10 may be part of at least one display 1 (illustrated as first, second and third displays 1a, 1 b and 1c, respectively). Each display 1 may be provided at a single corresponding location within at least one geographical area 14. In some embodiments, the display system 50 may include a single display 1 having at least two display faces 10. In other embodiments, the display system 50 may include at least two displays 1 each having at least one display face 10. In the non-limiting embodiment illustrated in FIG. 1A, the display system 50 includes three displays 1a, 1b and 1c, respectively, positioned at different locations within the geographical area 14. For illustrative purposes and brevity, each of the displays 1a, 1b and 1c is shown and described as including a single corresponding display face 10a, 10b and 10c.

In some applications, the at least one geographical area 14 may include at least one municipality or urban area. In other applications, the at least one geographical area 14 may include at least one rural area. In still other applications, the at least one geographical area 14 may include at least one municipality or urban area and at least one rural area. Each display 1 may be provided within the geographical area 14 at a location and in a manner which render the display face or faces 10 in the display 1 visible to observers such as motorists, pedestrians and/or cyclists, for example and without limitation. In some applications, each display 1 may be provided in an indoor area. In other applications, each display 1 may be provided in an outdoor area. In still other applications, the display system 50 may include multiple displays 1 at least one of which is provided in an indoor area and at least one of which is provided in an outdoor area.

At least one display control system 44 may controllably interface with the display face or faces 10 within each display 1 through at least one suitable communication link 8. The at least one communication link 8 may include at least one wireless communication link, at least one wired communication link, or any combination of wireless and wired communication links. The communication link 8 may include but is not limited to at least one server, at least one network of servers, at least one network of computers and/or other devices, at least one cellular telephone network, at least one telephone landline network, or any combination thereof. The display control system 44 may be suitably configured and programmed to present advertising and/or other content 40 on the display faces 10 in an alternating, sequential or circuitous pattern. In the non-limiting embodiment illustrated in FIG. 1A, the display faces 10a, 10b and 10c may be arranged in at least one display network or circuit 24. The display control system 44 may be suitably configured and programmed to effectively sequentially present the content 40 on and transfer the content 40 among the display faces 10a, 10b and 10c, respectively, in the display circuit 24. Accordingly, the display system 50 may substantially enhance visibility of the content 40 by observers at, near or approaching the displays 1a, 1b and 1c in different locations and from different directions within the geographical area 14, thereby dramatically increasing the number of observers who view the content 40 within a relatively short timeframe. Moreover, the display system 50 may enhance visibility of the content 40 to each observer by increasing the likelihood or probability that the observer will notice the content 40 as the observer travels to different locations within the geographical area 14.

Figure 1B:
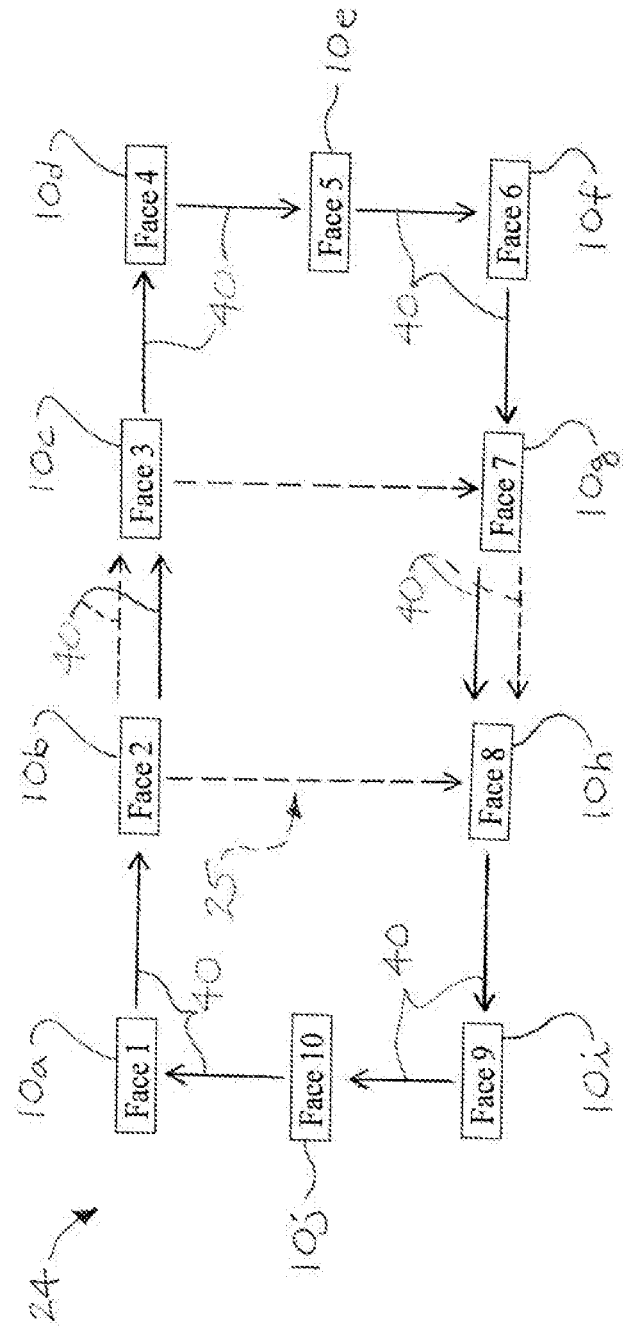
FIG. 1B a block diagram illustrating sequential presentation of content on all display faces in a display circuit or sequential presentation of the content on a selected subset of the display faces in a display circuit subset (illustrated in phantom) within the display circuit.

Referring next to FIG. 1B of the drawings, in some embodiments or implementations, the at least one display control system 44 (FIG. 1A) of the display system 50 may be suitably configured and programmed to selectively sequentially present content 40 on all display faces 10 within the display circuit 24. In other embodiments or implementations, the at least one display control system 44 may be suitably configured and programmed to sequentially present the content 40 on at least one selected subset of the display faces 10 within at least one display circuit subset 25 (illustrated in phantom) of the display circuit 24. In the non-limiting example illustrated in FIG. 1B, the display circuit 24 includes $1^{st}$-$10^{th}$ display faces 10a-10j, respectively. A typical display circuit subset 25 may include the second display face 10b, the third display face 10c, the seventh display face 10g and the eighth display face 10h. In the same or other embodiments or implementations, the display circuit subset 25 may include at least two and any desired sequence of the display faces 10a-10j in the display circuit 24.

Figure 2:
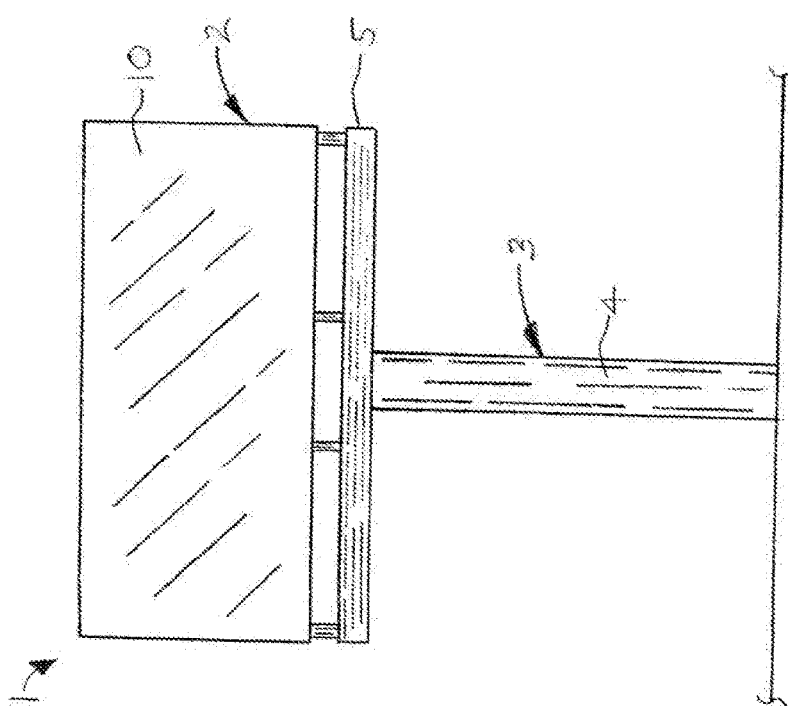
FIG. 2 is a front view of a typical billboard display having a single billboard panel and display face suitable for some implementations of the circuitous display systems and methods.
Figure 3:
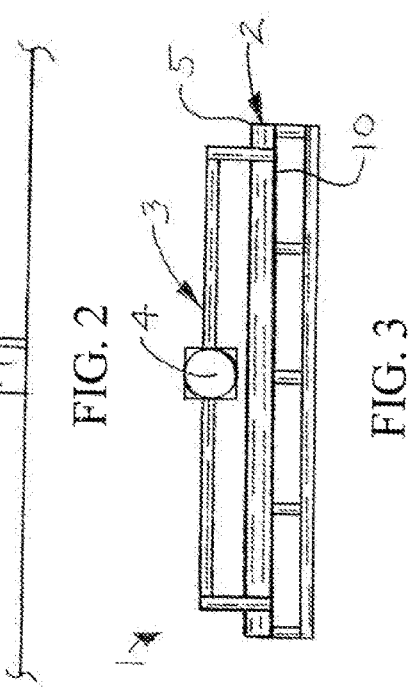
FIG. 3 is a top view of the single-paneled billboard display illustrated in FIG. 2.

Referring next to FIGS. 2-7 of the drawings, in some embodiments of the display system 50, each display 1 may include a billboard display. Each billboard display 1 may include at least one changeable display face 10 such as a changeable digital or mechanical display face known by those skilled in the art, for example and without limitation. As illustrated in FIGS. 2 and 3, in some embodiments, each billboard display 1 may include a billboard panel 2 having at least one display face 10. The billboard display 1 may have a conventional billboard design with a panel support structure 3 which supports the billboard panel 2. In some embodiments, the panel support structure 3 may include a post 4. A frame 5 may be provided on the post 4. The frame 5 may be suitably sized and configured to support or hold the billboard panel 2, typically in the conventional manner. In other embodiments, the panel support structure 3 may include a building, wall, pole, mountain, hill and/or other natural or manmade support as is known by those skilled in the art.

Figure 4:
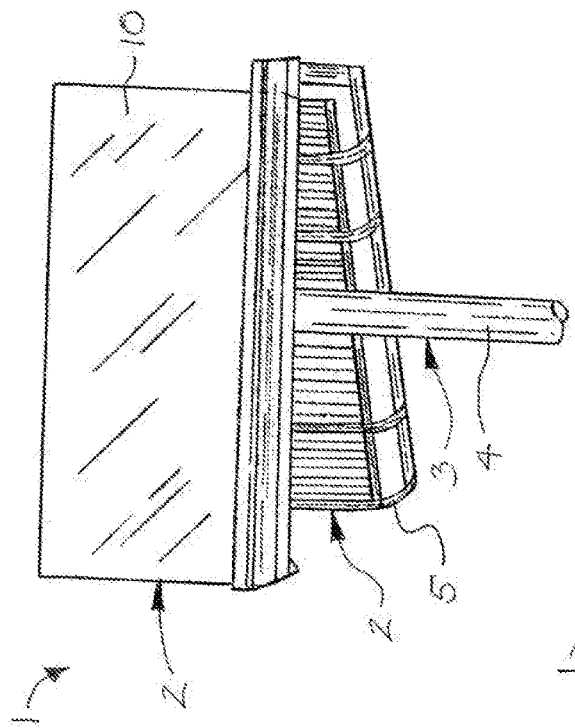
FIG. 4 is a bottom perspective view of a typical billboard display having a pair of billboard panels and respective display faces suitable for some implementations of the circuitous display systems and methods.
Figure 5:
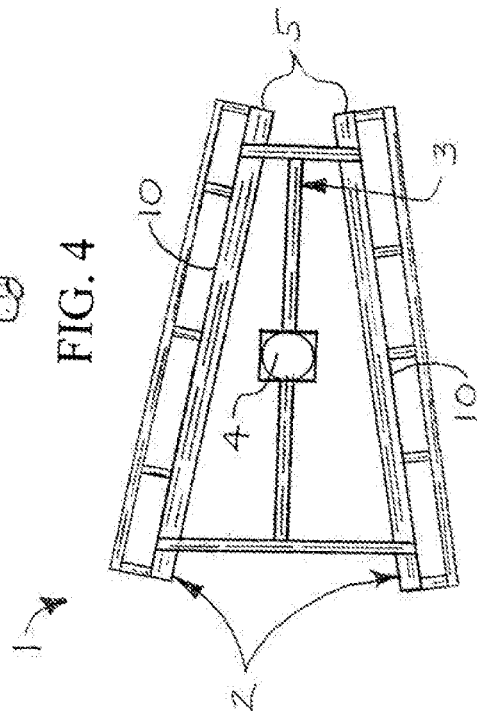
FIG. 5 is a top view of the double-paneled billboard display illustrated in FIG. 4.
Figure 6:
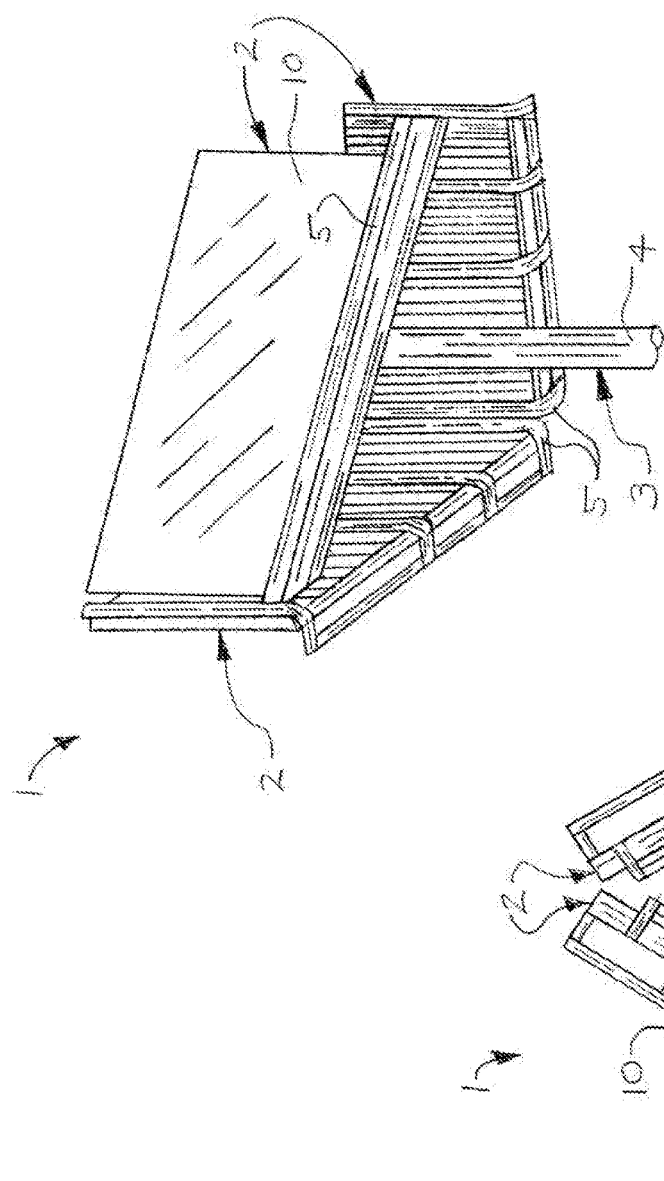
FIG. 6 is a bottom perspective view of a typical billboard display having three billboard panels and respective display faces suitable for some implementations of the circuitous display systems and methods.
Figure 7:
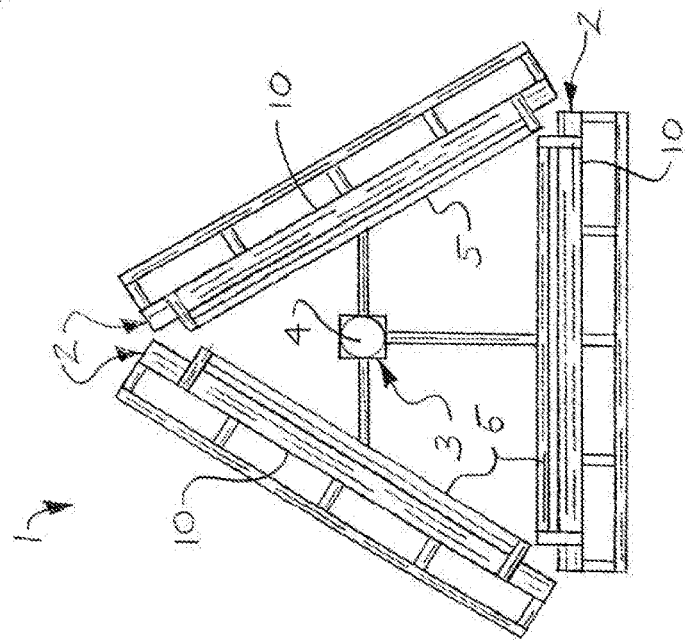
FIG. 7 is a top view of the triple-paneled billboard display illustrated in FIG. 6.

As illustrated in FIGS. 2 and 3, in some embodiments of the display system 50, each billboard display 1 may include a single billboard panel 2 having a single display face 10. The display face 10 may generally face a single direction in such a manner that it is rendered visible by observers on or approaching one side of the billboard display 1. As illustrated in FIGS. 4 and 5, in some embodiments or implementations of the display system 50, each billboard display 1 may include a pair of billboard panels 2 having a respective pair of display faces 10. The display faces 10 may generally face opposite directions in such a manner that they are simultaneously rendered visible by different sets of observers on or approaching opposite sides of the billboard display 1. As illustrated in FIGS. 6 and 7, in still other embodiments, each billboard display 1 may include three or more billboard panels 2 having respective display faces 10 which may face different directions. Accordingly, the display faces 10 may be visible to multiple sets of observers on respective multiple sides of the billboard display 1.

Figure 8:
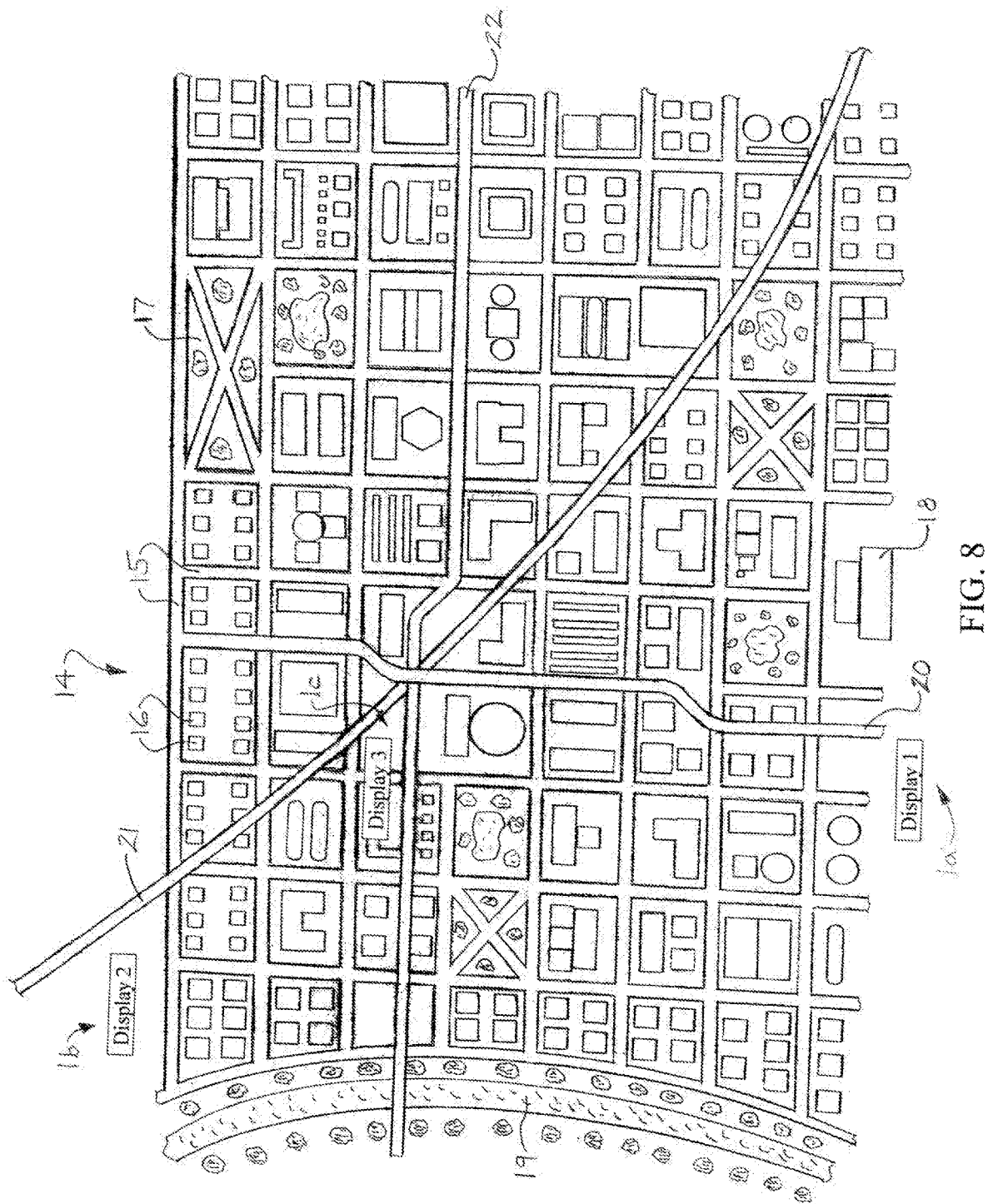
FIG. 8 is a map diagram illustrating a portion of a typical urban geographical area, with three billboard displays positioned at different locations within the geographical area in exemplary implementation of the circuitous display systems and methods.

Referring next to FIGS. 8 and 9A-9C of the drawings, in some applications, at least one display 1, each having at least one display face 10, of the display system 50 may be provided in at least one position or location within at least one geographical area 14. In FIG. 8, an exemplary urban geographical area 14 may include streets 15, residences 16, parks 17 and commercial buildings 18. Also shown is a river 19 and first, second and third highways 20, 21 and 22, respectively, such as interstate highways, for example and without limitation. At least one display 1 of the display system 50 may be placed within visibility of at least one selected high-traffic area within the geographical area 14. For example and without limitation, a first display 1a may be placed at a location at which the first highway 20 crosses a street 15. As illustrated in FIG. 9A, in some non-limiting embodiments or implementations, the first display 1a may include a single billboard panel 2 having a single display face 10a. A second display 1b may be placed adjacent to the second highway 21 and a street 15. As illustrated in FIG. 9B, the second display 1b may include a pair of billboard panels 2 having a respective pair of display faces 10b. A third display 1c may be placed adjacent to an intersection where the first highway 20 and the third highway 22 cross the second highway 21. As illustrated in FIG. 9C, the third display 1c may include three billboard panels 2 having three display faces 10c, respectively. Accordingly, the display face 10a of the first display 1a may be visible to pedestrians, motorists and cyclists who travel along the first highway 20 and the street 15, whereas the display faces 10b of the second display 1b may be visible to pedestrians, motorists and cyclists who travel along the second highway 21 and the street 15. The display faces 10c of the third display 1c may be visible to pedestrians, motorists and cyclists who travel along the first highway 20, the second highway 21 and the third highway 22. It will be recognized and understood, however, that the first display 1a, the second display 1b and the third display 1c and/or any other additional displays 1 within the geographical area 14 may each include the single-paneled billboard display (FIG. 9A), the double-paneled billboard display (FIG. 9B) or the triple-paneled billboard display (FIG. 9C), a billboard display having four or more billboard panels 2, or any combination of the single-paneled or multi-paneled billboard displays.

The at least one display control system 44 (FIG. 1A) of the display system 50 may be configured and programmed to sequentially present the content 40 on the display face 10a of the first display 1a, the display faces 10b of the second display 1b and the display faces 10c of the third display 1c, and/or any selected subset or subsets of the display faces 10a, 10b and 10c which may define at least one display circuit subset 25 within the display circuit 24, as was heretofore described with respect to FIG. 1B. For example and without limitation, in some applications or implementations, the display control system 44 may be configured and programmed to sequentially present the content 40 on the display circuit 24 (FIG. 1A) which includes the display face 10a of the first display 1a, the display faces 10b of the second display 1b and the display faces 10c of the third display 1c. In other applications or implementations, the display control system 44 may be configured and programmed to sequentially present the content 40 on a display circuit subset 25 (FIG. 1B) which includes only the two display faces 10b of the second display 1b or the three display faces 10c of the third display 1c, for example and without limitation.

Figure 10A:
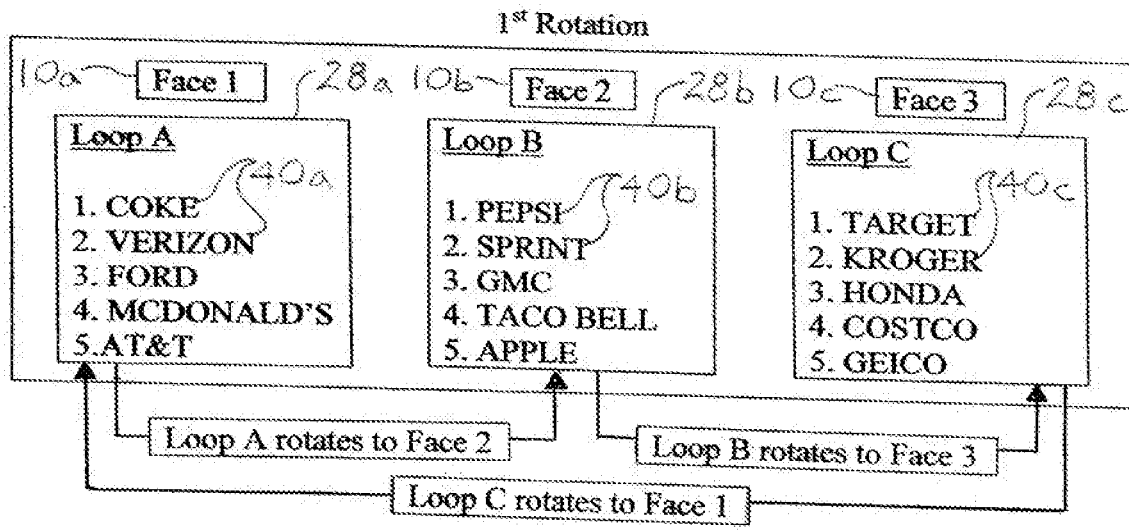
FIGS. 10A-10C illustrate first, second and third sequential loop rotations, respectively, of three respective loops of content in the form of listed ads among respective first, second and third display faces in a typical display circuit in exemplary implementation of the circuitous display systems and methods.
Figure 10B:
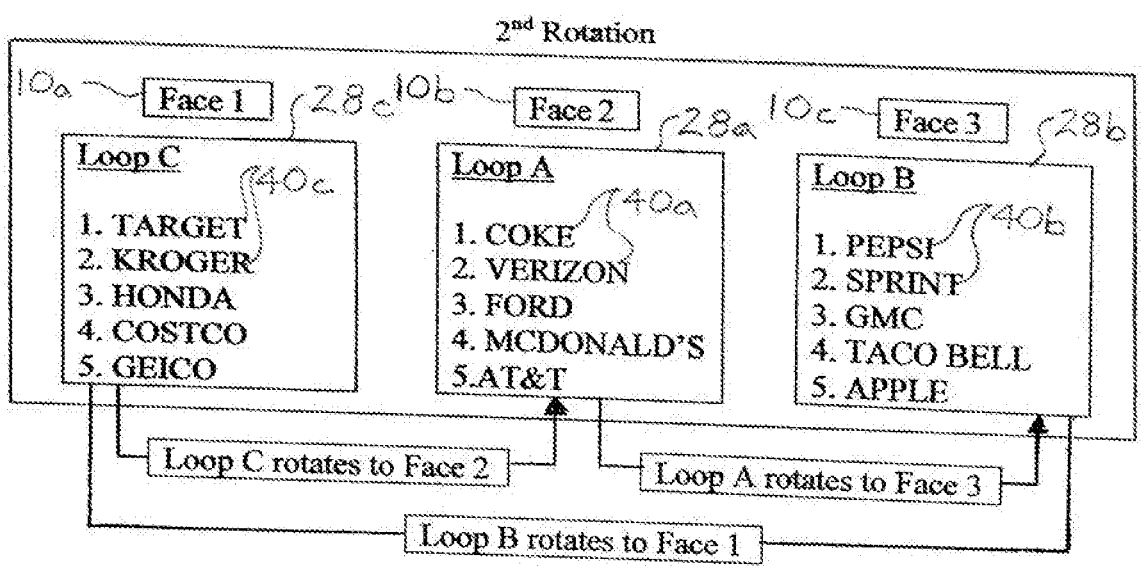
Figure 10C:
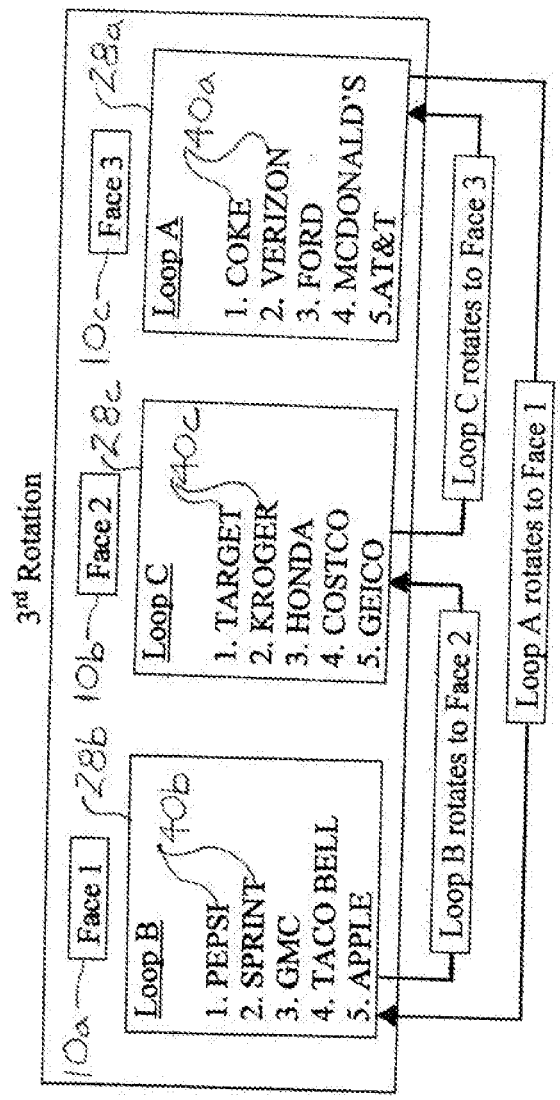

Referring next to FIGS. 10A-10C of the drawings, in some applications or implementations of the circuitous display systems and methods, the content 40 may be provided in the form of commercial advertisements which advertise various products and/or services. Accordingly, each ad content 40 may be provided by or on behalf of a subscriber or client to a service which utilizes the display control system 50. In the non-limiting example illustrated, the ad content 40 includes advertisements for COKE®, VERIZON®, FORD®, MCDONALD'S®, AT&T®, PEPSI®, SPRINT®, GMC®, TACO BELL®, APPLE®, TARGET®, KROGER®, HONDA®, COSTCO® AND GEICO®. The ad content 40 for each product or service may include a name, logo or name/logo combination, as well as various texts and/or visual graphics. The items of ad content 40 which are sequentially presented on the same display face 10 before being rotated to the next display face 10 in the display circuit 24 or display circuit subset 25 may be ordered in a corresponding content loop 28. Accordingly, the listed ad content 40 in each content loop 28 may be sequentially presented on each display face 10 and then rotated to the next display face 10 in the display circuit 24 or display circuit subset 25 for sequential presentation on that display face 10 in that loop rotation, and so on. The number of content loops 28 may thus correspond to the total number of display faces 10 in the display circuit 24. Additionally or alternatively, one or more content loops 28 may correspond in number to at least one subset of display faces 10 within the total number of display faces 10 in the display circuit 24, defining at least one display circuit subset 25 (FIG. 1B).

In the non-limiting example illustrated in FIGS. 10A-10C, a first content loop 28a (Loop A) includes the listed ad content 40a for COKE®, VERIZON®, FORD®, MCDONALD'S® and AT&T®, respectively. A second content loop 28b (Loop B) includes the listed ad content 40b for PEPSI®, SPRINT®, GMC®, TACO BELL® and APPLE®. A third content loop 28c (Loop C) includes the listed ad content 40c for TARGET®, KROGER®, HONDA®, COSTCO® AND GEICO®.

In a first loop rotation, illustrated in FIG. 10A, the ad content 40a for the first content loop 28a may be sequentially presented on the first display face 10a. Simultaneously, the ad content 40b for the second content loop 28b may be sequentially presented on the second display face 10b and the ad content 40c for the third content loop 28c may be sequentially presented on the third display face 10c. Each listed ad content 40 may be presented on the corresponding display face 10 for a predetermined or preset display time, such as 8 seconds, for example and without limitation. Thus, if each content loop 28 has five listed items of ad content 40, the total time for all the listed ad content 40a to be presented on the first display face 10a, the listed ad content 40b to be presented on the second display face 10b and the listed ad content 40c to be presented on the third display face 10c in the first loop rotation would be 40 seconds.

Upon completion of the first loop rotation, the first content loop 28a, the second content loop 28b and the third content loop 28c may transition to a second loop rotation (FIG. 10B). Accordingly, as illustrated in FIGS. 10A and 10B, the listed ad content 40a in the first content loop 28a may rotate from the first display face 10a to the second display face 10b. Simultaneously, the listed ad content 40b in the second content loop 28b may rotate from the second display face 10b to the third display face 10c, and the listed ad content 40c in the third content loop 28c may rotate from the third display face 10c to the first display face 10a. In the second loop rotation, therefore, the listed ad content 40c of the third content loop 28c may be sequentially presented on the first display face 10a, the listed ad content 40a of the first content loop 28a may be sequentially presented on the second display face 10b and the listed ad content 40b of the second content loop 28b may be sequentially presented on the third display face 10c.

Upon completion of the second loop rotation in FIG. 10B, the first content loop 28a, the second content loop 28b and the third content loop 28c may transition to a third loop rotation (FIG. 1(C). Accordingly, the listed ad content 40c in the third content loop 28c may rotate from the first display face 10a to the second display face 10b. The listed ad content 40a in the first content loop 28a may rotate from the second display face 10b to the third display face 10c. The listed ad content 40b in the second content loop 28b may rotate from the third display face 10c to the first display face 10a. The listed content 40c of the third content loop 28c, the listed ad content 40a of the first content loop 28a and the listed ad content 40b of the second content loop 28b may then be sequentially presented on the first display face 10a, the second display face 10b and the third display face 10c, respectively. Upon completion of the third loop rotation, the first content loop 28a, the second content loop 28b and the third content loop 28c may rotate back to the first display face 10a, the second display face 10b and the third display face 10c, respectively, as illustrated in FIG. 10A, and the method may repeat.

Referring next to FIGS. 11A-11I of the drawings, the listed ad content 40 in the first content loop 28a, second content loop 28b and third content loop 28c may be sequentially presented on the respective first display face 10a, second display face 10b and third display face 10c throughout the first, second and third loop rotations. FIGS. 11A-11C illustrate a typical first loop rotation for the first content loop 28a, the second content loop 28b and the third content loop 28c on the first display face 10a, the second display face 10b and the third display face 10c, respectively. As illustrated in FIG. 11A, throughout the first loop rotation (FIG. 10A), the listed ad content 40a in the first content loop 28a may be sequentially presented on the first display face 10a. Thus, the listed ad content 40a for COKE® may appear first on the first display face 10a, as illustrated, followed by the ad content 40a for VERIZON®, FORD®, MCDONALD'S® and AT&T®, respectively. Simultaneously, as illustrated in FIG. 11B, in a similar manner, the listed ad content 40b of the second content loop 28b may be sequentially presented on the second display face 10b, and the listed ad content 40c of the third content loop 28c may be sequentially presented on the third display face 10c, as illustrated in FIG. 11C.

A typical second loop rotation for the first content loop 28a, the second content loop 28b and the third content loop 28c is shown in FIGS. 11D-11F, respectively. As illustrated in FIG. 11I), the third content loop 28c has transitioned from the third display face 10c (FIG. 11C) to the first display face 10a. As illustrated in FIG. 11E, the first content loop 28a has transitioned from the first display face 10a (FIG. 11A) to the second display face 10b, and the second content loop 28b has transitioned from the second display face 10b (FIG. 11B) to the third display face 10c, as illustrated in FIG. 11F. Thus, the listed ad content 40c in the third content loop 28c may be sequentially presented on the first display face 10a. Accordingly, the listed ad content 40c for TARGET® may appear first on the first display face 10a, followed by the ad content 40c for KROGER®, HONDA®, COSTCO® and GEICO®, respectively. Simultaneously, as illustrated in FIG. 11E, in a similar manner, the listed ad content 40a in the first content loop 28a may be sequentially presented on the second display face 10b, and the listed ad content 40b in the second content loop 28b may be sequentially presented on the third display face 10c, as illustrated in FIG. 11F.

A typical third loop rotation for the first content loop 28a, the second content loop 28b and the third content loop 28c is shown in FIGS. 11G-11I. As illustrated in FIG. 11G, the second content loop 28b has transitioned from the third display face 10c (FIG. 11F) to the first display face 10a. As illustrated in FIG. 11l, the third content loop 28c has transitioned from the first display face 10a (FIG. 11D) to the second display face 10b, and the first content loop 28a has transitioned from the second display face 10b (FIG. 11E) to the third display face 10c, as illustrated in FIG. 11I. Thus, the ad content 40b in the second content loop 28b may be sequentially presented on the first display face 10a. Accordingly, the listed ad content 40b for PEPSI® may appear first on the first display face 10a, followed by the ad content 40b for SPRING®, GMC®, TACO BELL® and APPLE®, respectively. Simultaneously, as illustrated in FIG. 11H, in a similar manner, the listed ad content 40c in the third content loop 28c may be sequentially presented on the second display face 10b, and the listed ad content 40a in the first content loop 28a may be sequentially presented on the third display face 10c, as illustrated in FIG. 11I.

In some applications or implementations, the listed ad content 40 for the clients in each content loop 28 may advertise the same product or service as it is presented on the first display face 10a, the second display face 10b and the third display face 10c through the respective loop rotations. In other applications or implementations, the listed ad content 40 for at least one client in each content loop 28 may advertise different products or services as it is presented on the display faces 10 in the loop rotations. For example and without limitation, as it is presented on the first display face 10a in the first loop rotation of FIG. 11A, the ad content 40a for FORD® may include advertising text and/or graphics for a FORD® TAURUS automobile. As it is subsequently presented on the second display face 10*b* in the second loop rotation of FIG. 11E, the ad content 40*a* for FORD® may include advertising text and/or graphics for a FORD® F-150 pickup truck.

Referring next to FIGS. 12-14 of the drawings, the display control system 44 (FIG. 1A) may use playlists 30 to arrange, organize, sequence and present the ad content 40 of each content loop 28 on the display faces 10 throughout the loop rotations, as well as to transition or rotate each content loop 28 to the next display face 10 in the display circuit 24 or display circuit subset 25 for the next loop rotation. Each playlist 30 may be specific to each display face 10 in the display circuit 24. For example and without limitation, each playlist 30 may include a rotation number column 31, an ad display time column 32, a loop column 33, a slot column 34 and a client column 35. The number of the rotation loop may be listed in the rotation number column 31. The ad display time which indicates the duration of each ad content 40 on the display face 10 may appear in the display time column 32. Each rotation loop may be indicated by sequential numbers and/or letters in the loop column 33. The order in which the ad content 40 for each client will appear on the display face 10 in each rotation loop may appear in the slot column 34. The client or subscriber responsible for each ad content 40 may be identified in the client column 35, which is indicated in the playlist 30 by the particular ad content 40 for that client.

FIG. 12 illustrates a typical exemplary playlist 30*a* for the first display face 10*a* which was heretofore described with respect to FIGS. 10A, 11A, 11D and 11G. Accordingly, the playlist 30 lists the ad content 40*a* in the first rotation content loop 28*a* (Loop A) as being the first rotation content loop 28 presented on the first display face 10*a* in the first loop rotation, followed by the ad content 40*c* in the third rotation content loop 28*c* (Loop C) in the second loop rotation and the ad content 40*b* in the second rotation content loop 28*b* (Loop B) in the third loop rotation, respectively. The ad display time for each ad content 40 in each rotation content loop 28 is indicated as 8 seconds in the display time column 32, corresponding to a total of 40 seconds for each rotation content loop 28 or loop rotation. The order in which the ad content 40 in each rotation content loop 28 appears on each display face 10 is listed by number in the slot column 34. Similarly, FIG. 13 illustrates a typical playlist 30*b* for the second display face 10*b*, and FIG. 14 illustrates a typical playlist 30*c* for the third display face 10*c* throughout the first, second and third loop rotations.

Referring next to FIG. 15 of the drawings, a functional block diagram of a typical display control system 44 suitable for implementation of the circuitous display systems and methods is illustrated. The display control system 44 may include at least one user device 45. The user device 45 may include at least one desktop computer, notebook computer, laptop computer, personal digital assistant (PDA), tablet, smartphone and/or other device or combination or network of devices or systems capable of implementing the circuitous display systems and methods of the disclosure.

In some embodiments, at least one server 52 may interface with the user device 45 through at least one communication link 8. At least one processor 60 may communicate with the server 52 through at least one communication link 8. The at least one processor 60 may controllably communicate or interface with the first display face 10*a*, the second display face 10*b* and the third display face 10*c* through one or more wired interfaces and/or wireless interfaces according to the knowledge of those skilled in the art. In some embodiments, the at least one processor 60 may include a first processor 60*a*, a second processor 60*b* and a third processor 60*c* which controllably communicate with the first display face 10*a*, the second display face 10*b* and the third display face 10*c*, respectively. Responsive to input from the user device 45, typically via the server 52, the first processor 60*a*, the second processor 60*b* and the third processor 60*c* may be configured and programmed to store and load the playlist 30 for each corresponding display face 10 and present the ad content 40 of the content loops 28 in the playlist 30 on the display face 10 throughout the loop rotations, which may be implemented typically as was heretofore described with respect to FIGS. 10A-10C and FIGS. 11A-11I.

Referring next to FIGS. 16A and 16B of the drawings, a functional block diagram of a typical user device 45 suitable for implementation of the circuitous display systems and methods is illustrated in FIG. 16A, and a typical processor 60 is illustrated in FIG. 16B. As illustrated in FIG. 16A, the user device 45 may include a device central processing unit (CPU) 46. A user interface 47 and a display 51 may communicate with the device CPU 46. The device CPU 46 may interface with a device database 48. At least one port 54 may interface with the device database 48. In some embodiments, a transceiver 56 may interface with the device CPU 46 to facilitate a wireless communication link 8 (FIG. 15) with the processors 60 either directly or through the server 52. Each of the device CPU 46, user interface 47, device database 48, display 51, port 54 and transceiver 56 of the user device 45 may include at least one hardware component, at least one software component, or any combination of at least one hardware component and at least one software component which carry out the functions of the user device 45 according to the knowledge of those skilled in the art.

As illustrated in FIG. 16B, each processor 60 may include a processor central processing unit (CPU) 61. A processor database 62 and a timer 63 may interface with the processor CPU 61. In some embodiments, a processor transceiver 64 may interface with the processor CPU 61. The processor transceiver 64 may facilitate a wireless communication link 8 with the server 52 or with the device transceiver 56 of the user device 45. A content display counter 65 may interface with the processor CPU 61. Each of the processor CPU 61, processor database 62, timer 63, processor transceiver 64 and content display counter 65 of each processor 60 may include at least one hardware component, at least one software component, or any combination of at least one hardware component and at least one software component which carry out the functions of the processor 60 according to the knowledge of those skilled in the art.

In typical implementation of the display system 50, the port 54 of the user device 45 may have the capacity to facilitate loading of the playlists 30 into the device database 48 by a user. The user interface 47 may have the capability to facilitate entry, deletion, editing and rearrangement or reordering of the content 40 in each playlist 30. The device CPU 46 of the user device 45 may have the capacity to transmit the playlists 30 to the processor CPU 61 and processor database 62 of each processor 60 (FIG. 16B) typically via the at least one communication link 8.

Typically via input from the timer 63, the processor CPU 61 of the processor 60 may have the capability to monitor the display time for each listed item of ad content 40 in each content loop 28 during each loop rotation, remove the ad content 40 from the display face 10 and present the next succeeding item of ad content 40 on the display face 10. The content display counter 65 may have the capacity to count the number of loop rotations of each listed item of ad content 40 for each client to correspond to a predetermined or preset display or ad exposure time typically subject to the advertising needs, financial constraints or subscription agreement of the client. Accordingly, the processor CPU 61 of each processor 60 may limit the number of loop rotations of the ad content 40 through the display circuit 24 for the particular client depending on the terms of a subscriber agreement or contract with the client. Via user input typically through the user interface 47 and/or port 54 and device database 48 of the user device 45, the processor CPU 61 of each processor 60 may additionally or alternatively have the capacity to limit rotation of the ad content 40 for a particular client to a selected display circuit subset 25 (FIG. 1B) of display faces 10 within the display circuit 24, typically subject to the advertising needs, financial constraints of the client and according to the terms of the subscriber agreement or contract with the client.

In some embodiments or implementations, each processor 60 may be provided on-site at its corresponding display face 10. Accordingly, the user device 45 may be used to implement the method through the Internet via the server 52. In other embodiments, the user device 45 may communicate directly with the processors 60 typically through the communication link 8. In still other embodiments, the processors 60 may be a component part of the user device 45. In yet other embodiments, the user device 45, the server 52 and the processors 60 may be included in a single unit.

Each of the device CPU 46 and the processor CPU 61 may include any electrical conduit, circuit, logic circuit, circuit board, chip and/or other component or series or combination of components which is/are capable of executing the various functions of the display system 50. In some embodiments, the functions of the device CPU 46 and the processor CPU 61 may be carried out by the same central processing unit.

Figure 17:
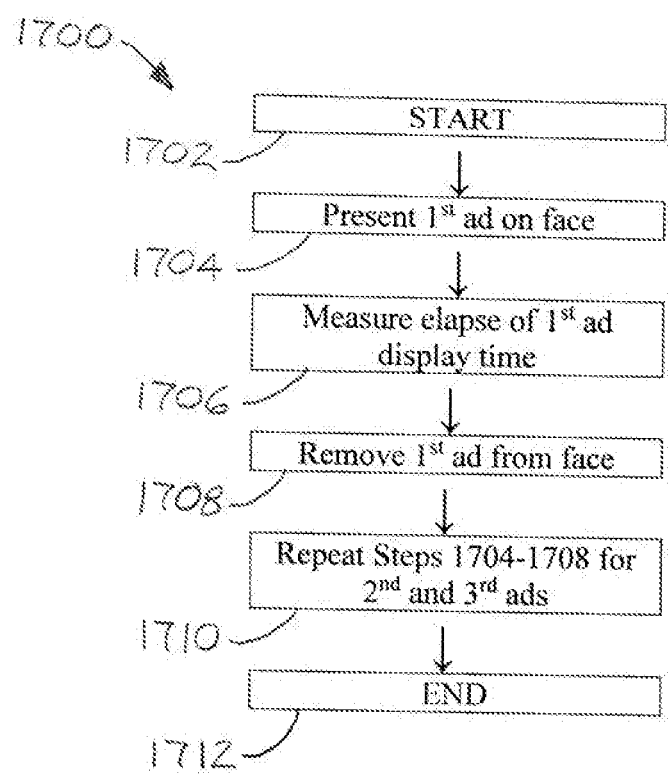
FIG. 17 is a typical software algorithm illustrating sequential presentation of listed content in each content loop on each display face throughout a loop rotation in typical implementation of the circuitous display systems and methods.

Referring next to FIG. 17 of the drawings, a typical software algorithm which may be implemented by each processor 60 to sequentially present listed content in each content loop on each display face throughout a loop rotation in typical implementation of an illustrative embodiment of the circuitous display systems and methods is generally indicated by reference numeral 1700. The method may begin at Step 1702. At Step 1704, the first listed ad content which corresponds to a first client or subscriber in a content loop may be presented on the display face. At Step 1706, the display time of the first ad content may be measured or monitored as the first ad content remains on the display face. At Step 1708, when the display time for the first ad content elapses or has expired, the first ad content may be removed from the display face. At Step 1710, Steps 1704-1708 may be repeated for each of the remaining listed items of ad content in the content loop. At Step 1712, the method may end or return to Step 1702.

Figure 18:
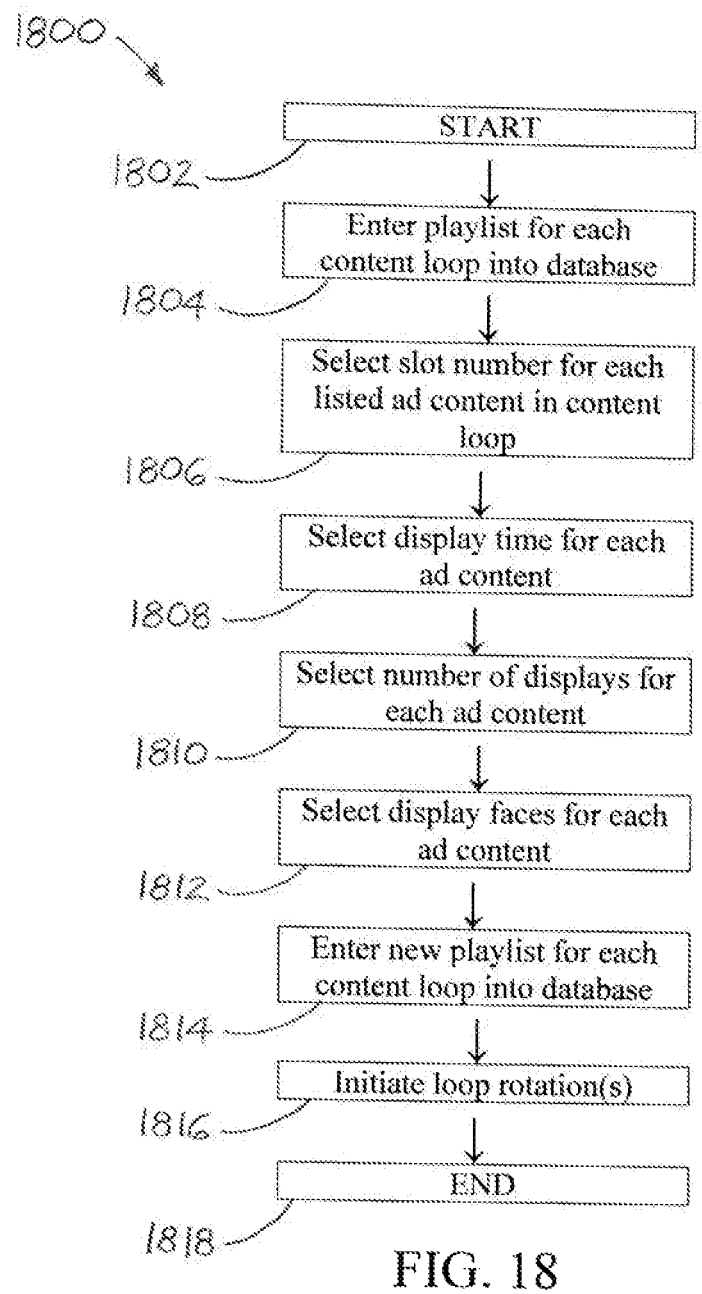
FIG. 18 is a flow diagram illustrating typical user-implemented steps in initiating and implementing the circuitous display systems and methods.

Referring next to FIG. 18 of the drawings, a flow diagram illustrating typical user-implemented steps in initiating the circuitous display methods at the user device 45 is generally indicated by reference numeral 1800. The method may begin at Step 1802. At Step 1804, the playlist for each content loop may be entered into the database of the user device. At Step 1806, the slot number for each ad content in each content loop may be selected. At Step 1808, the display time for each ad content may be selected. At Step 1810, the number of displays or loop rotations for each listed ad content in each content loop may be selected. At Step 1812, the number of display faces, or the subset of display faces which will form a display circuit subset, may be selected for at least one of the items of listed ad content in each content loop. At Step 1814, in some applications, a new playlist for each content loop may be entered into the database. At Step 1816, the loop rotations may be initiated. At Step 1818, a user may selectively end the loop rotations.

Figure 19:
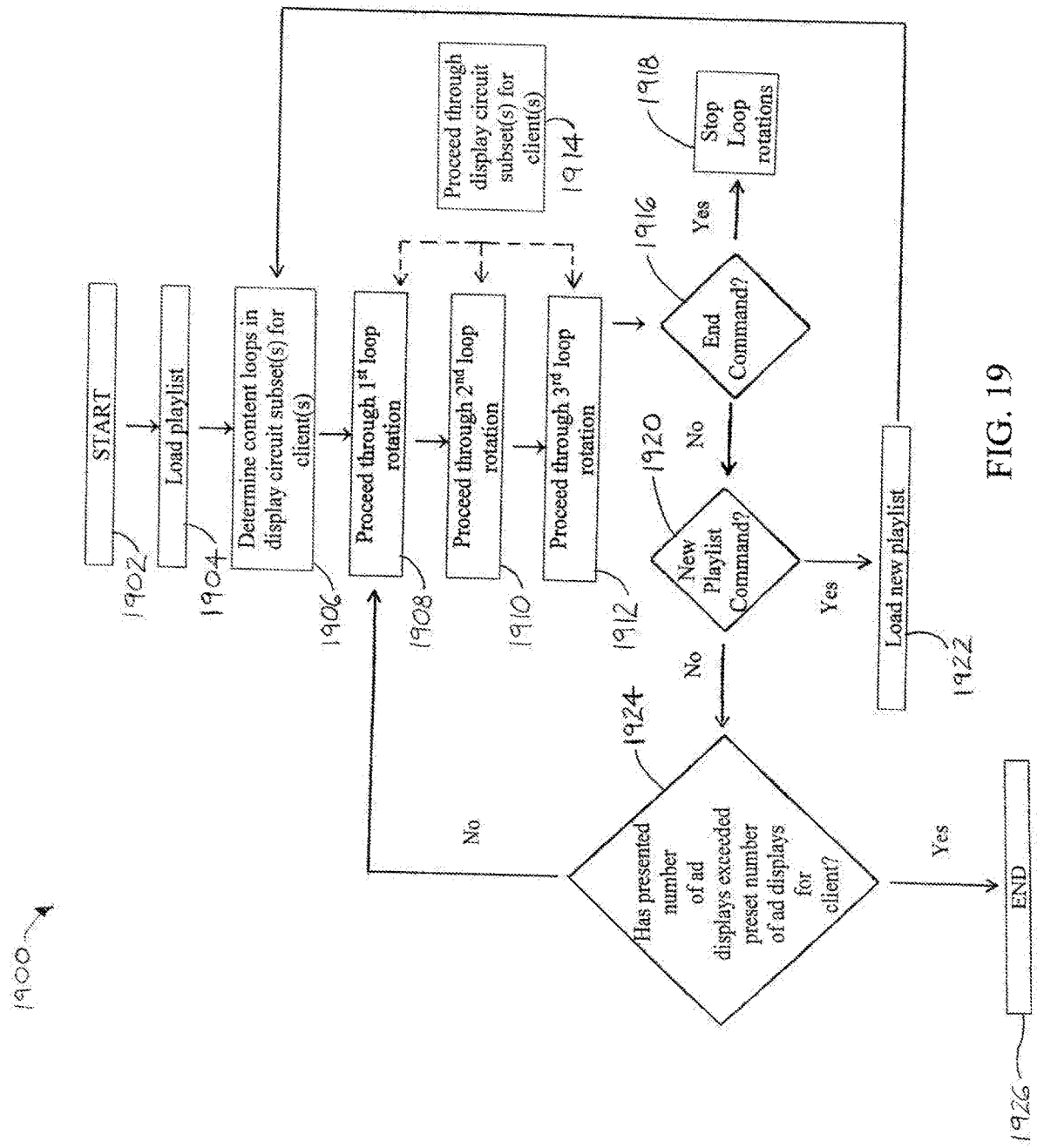
FIG. 19 is a typical software algorithm illustrating sequential presentation of content on each display face through first, second and third loop rotations in typical implantation of the circuitous display methods.

Referring next to FIG. 19 of the drawings, a typical software algorithm illustrating sequential presentation of content on each display face through first, second and third loop rotations in typical implantation of the circuitous display methods is generally indicated by reference numeral 1900. The method may begin at Step 1902. At Step 1904, a playlist may be loaded at each display face. At Step 1906, the content loops in any display circuit subset for any client who subscribed to a display circuit subset may be determined. At Step 1908, the first loop rotation at each display face may proceed. At Step 1910, the second loop rotation at each display face may proceed. At Step 1912, the third loop rotation at each display face may proceed. At Step 1914, simultaneous to Steps 1908, 1910 and 1912, the display circuit subset(s) may proceed for any client(s) determined to have subscribed to a display circuit subset at Step 1906.

At Step 1916, a query may determine whether an end command was received through the user interface of the user device. If an end command was received, then at Step 1918, the display control system may stop further loop rotations.

If an end command was not received at Step 1916, then at Step 1920, a query may determine whether a new playlist was entered by the user. If a new playlist was entered by the user, then at Step 1922, the new playlist may be loaded and the method may return to Step 1906.

If a new playlist was determined to have not been entered by the user at Step 1920, then at Step 1924, a query may determine whether the presented number of ad content displays has exceeded the preset number of ad displays for each client. If the presented number of ad content displays has exceeded the preset number of ad displays for at least one client, then the method may end at Step 1926 for that client. If the presented number of ad displays has not exceeded the preset number of ad displays for a client, then the method may return to Step 1908 for that client.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A method of controlling a plurality of display faces throughout separate or discrete areas or locations in at least one geographical area, comprising:
   providing a display circuit having a plurality of discrete billboard displays in a plurality of separate or locations within at least one geographical area,
      the plurality of billboard displays including a first billboard display and a second billboard display,
      the first and the second billboard displays each being physically spaced from one another and each including a panel support structure having a post and a frame carried by the post;
      the first billboard display having a first display face;
      the second billboard display having a second display face
      a display control system controllably interfacing with each display face through at least one communication link; and
      the display control system configured and programmed to present content on the first display face and the second display face in a repeating alternating, sequential or circuitous pattern;

a plurality of content loops including a first content loop and a second content loop;

the first content loop including first content from a first content client and second content from a second content client;

the second content loop including third content from a third content client and fourth content from a fourth content client;

arranging, organizing and sequencing the content of each of a plurality of content loops by operation of the at least one display control system, such that at a first point in time the first content loop is presented on the first billboard display while simultaneously the second content loop is displayed on the second billboard display, and at a later second point in time in a same day as the first point in time, the first content loop is presented on the second billboard display while simultaneously the second content loop is displayed on one of the first billboard display and a third billboard display;

whereby visibility of the content by observers at, near or approaching the plurality of discrete billboard displays in the plurality of discrete areas or locations and from different directions within the at least one geographical area is substantially increased, thereby increasing a number of observers throughout the at least one geographical area who view the content within a selected timeframe.

2. The method of claim 1 wherein presenting the content on the at least one display face of the plurality of discrete billboard displays comprises presenting the content on a plurality of display faces of the plurality of discrete billboard displays.

3. The method of claim 1, wherein presenting the content on the at least one display face of the plurality of discrete billboard displays comprises presenting the content on at least a first display face and a second display face at the plurality of discrete billboard displays, respectively.

4. The method of claim 2 wherein presenting the content on the at least one display face of the plurality of discrete billboard displays comprises presenting the content on at least a first display face, a second display face and a third display face arranged in the at least one display circuit at the plurality of discrete billboard displays, and further comprising sequentially presenting the content on at least two of the at least a first display face, a second display face and a third display face arranged in at least one display circuit subset within the at least one display circuit.

5. The method of claim 1, wherein each billboard display of the plurality of discrete billboard displays is spaced at least one city block from other billboard displays of the plurality of discrete billboard displays.

6. The method of claim 1, wherein each billboard display of the plurality of discrete billboard displays is spaced a plurality of city blocks from other billboard displays of the plurality of discrete billboard displays.

7. The method of claim 1, wherein at a third point in time after the second point in time, the first content loop is presented on the first billboard display while simultaneously the second content loop is displayed on the second billboard display, and the first point in time, the second point in time, and the third point in time are each within the same day.

8. A method of controlling a plurality of display faces throughout separate or discrete areas or locations in at least one geographical area, comprising:

providing a display circuit having a plurality of discrete billboard displays in a plurality of separate locations within at least one geographical area, the plurality of billboard displays including a first billboard display and a second billboard display, the first and the second billboard displays each being physically spaced from one another and each including a panel support structure having a post and a frame carried by the post;

the first billboard display having a first display face;

the second billboard display having a second display face;

a display control system controllably interfacing with each display face through at least one communication link; and the display control system configured and programmed to present content on the first display face and the second display face in a repeating alternating, sequential or circuitous pattern;

a plurality of content loops including a first content loop and a second content loop;

the first content loop including first content from a first content client;

the second content loop including second content from a second content client;

arranging, organizing and sequencing the content of each of a plurality of content loops by operation of the at least one display control system, such that at a first point in time the first content loop is presented on the first billboard display while simultaneously the second content loop is displayed on the second billboard display, and at a later second point in time the first content loop is presented on the second billboard display while simultaneously the second content loop is displayed on one of the first billboard display and a third billboard display;

whereby visibility of the content by observers at, near or approaching the plurality of discrete billboard displays in the plurality of separate or discrete areas or locations and from different directions within the at least one geographical area is substantially increased, thereby increasing a number of observers throughout the at least one geographical area who view the content within a selected timeframe; and presenting the content on at least two of the plurality of display faces in an automatic circuitous, sequential or rotational pattern in at least one display circuit subset within the at least one display circuit by operation of the at least one display control system.

9. The method of claim 8 wherein providing a plurality of discrete billboard displays at a plurality of separate or discrete areas or locations within at least one geographical area comprises providing a plurality of discrete billboard displays at a plurality of separate or discrete areas or locations in an urban geographical area.

10. The method of claim 8 wherein providing a plurality of discrete billboard displays at a plurality of separate or discrete areas or locations within at least one geographical area comprises providing a plurality of discrete billboard displays at a plurality of separate or discrete areas or locations in a rural geographical area.

11. A circuitous display system, comprising:
at least one display circuit having a plurality of discrete billboard displays in a plurality of separate areas or locations within at least one geographical area, each billboard display of the plurality of discrete billboard displays being spaced from each other billboard display, and each billboard display including:
  a panel support structure having a post and a frame carried by the post;
  at least one display face on the frame; and
  at least one display control system controllably interfacing with the at least one display face, the at least one display control system configured to arrange, organize and sequence the content of each of a plurality of content loops by operation of the at least one display control system, each of the plurality of content loops having different content than others of the plurality of content loops, and sequentially present content in the plurality of content loops on the at least one display face in a repeating automatic circuitous, sequential or rotational pattern, with the plurality of content loops simultaneously presented on the at least one display face of the plurality of discrete billboard displays, respectively, whereby visibility of the content by observers at, near or approaching the plurality of discrete billboard displays in the plurality of separate or discrete areas or locations and from different directions within the at least one geographical area is substantially increased, thereby increasing a number of observers throughout the at least one geographical area who view the content within a selected timeframe;
  the plurality of billboard displays includes a first billboard display, a second billboard display, and a third billboard display, and
  the plurality of content loops includes a first content loop including content from a first content client, a second content loop including content from a second content client, and a third content loop including content from a third content client, and
the at least one display control system configured and programmed to cause
  at a first point in time, the first billboard display to present the first content loop, the second billboard display present the second content loop, and the third billboard display present the third content loop, and
  at a second later point in time, the first billboard display to present the third content loop, the second billboard display present the first content loop, and the third billboard display present the second content loop.

12. The circuitous display system of claim 11 wherein the at least one display face comprises a plurality of display faces.

13. The circuitous display system of claim 11 wherein the at least one geographical area comprises an urban geographical area.

14. The method of claim 11, wherein the plurality of billboard displays includes a first billboard display and a second billboard display, and the first billboard display presents content from a first content client while simultaneously the second billboard display presents content from a second content client.

15. The method of claim 11, wherein the plurality of billboard displays includes a first billboard display, a second billboard display, and a third billboard display, and the first billboard display presents content from a first content client while simultaneously the second billboard display presents content from a second content client, while simultaneously the third billboard display presents content from a third content client.

16. The method of claim 11, wherein the at least one display control system is further configured and programmed to cause at a third point in time later than the second point in time, the first billboard display to present the second content loop, the second billboard display present the third content loop, and the third billboard display present the first content loop, and the first, the second, and the third point in time being on a same day.

17. The method of claim 16 wherein the first content loop includes content from a fourth content client, the second content loop includes content from a fifth content client, and the third content loop includes content from a sixth content client.

18. The method of claim 17, wherein the first content loop presents content from the first content client before the fourth content client on the first content loop on each of the first billboard display, the second billboard display, and the third billboard display, the second content loop presents content from the second content client before the fifth content client on the second content loop on each of the first billboard display, the second billboard display, and the third billboard display, and third content loop presents content from the third content client before the sixth content client on the third content loop on each of the first billboard display, the second billboard display, and the third billboard display.

* * * * *